(12) United States Patent
Herzog et al.

(10) Patent No.: US 11,130,289 B2
(45) Date of Patent: Sep. 28, 2021

(54) DEVICE FOR THE GENERATIVE PRODUCTION OF A THREE-DIMENSIONAL OBJECT

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Fabian Zeulner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 555 days.

(21) Appl. No.: 15/774,570

(22) PCT Filed: Nov. 10, 2016

(86) PCT No.: PCT/EP2016/077230
§ 371 (c)(1),
(2) Date: May 8, 2018

(87) PCT Pub. No.: WO2017/084957
PCT Pub. Date: May 26, 2017

(65) Prior Publication Data
US 2018/0333919 A1 Nov. 22, 2018

(30) Foreign Application Priority Data
Nov. 16, 2015 (DE) .......................... 102015119747.2

(51) Int. Cl.
*B29C 64/277* (2017.01)
*B29C 64/153* (2017.01)
(Continued)

(52) U.S. Cl.
CPC .............. *B29C 64/277* (2017.08); *B08B 5/04* (2013.01); *B08B 15/002* (2013.01); *B08B 15/04* (2013.01);
(Continued)

(58) Field of Classification Search
CPC .................................................... B29C 64/277
See application file for complete search history.

(56) References Cited

FOREIGN PATENT DOCUMENTS

| DE | 102004031881 A1 | 1/2006 |
|----|----|----|
| DE | 102006052292 A1 | 5/2008 |

(Continued)

OTHER PUBLICATIONS

International Search Report Corresponding to Application No. PCT/EP2016/077230 dated Apr. 3, 2017.

(Continued)

*Primary Examiner* — Larry W Thrower
(74) *Attorney, Agent, or Firm* — Dority & Manning, P.A.

(57) ABSTRACT

An apparatus for the generative production of a three-dimensional object by successive, selective layer-by-layer solidification of construction material layers of a solidifiable construction material by means of at least one energy beam, comprising at least one device for generating at least one energy beam for selective layer-by-layer solidification of individual construction material layers of a solidifiable construction material, wherein the device is configured to generate an energy beam directed directly onto a construction plane, and an exhaust device which is configured to exhaust non-solidified construction material detached from the construction plane during processing and/or process gases arising during processing, wherein the exhaust device comprises at least one exhaust element through which a suction flow may or does flow, wherein at least one passage opening is formed in the at least one exhaust element for passage of an (Continued)

energy beam generated by the device and directed directly onto the construction plane.

20 Claims, 4 Drawing Sheets (51) Int. Cl.

| | |
|---|---|
| B08B 15/04 | (2006.01) |
| B08B 5/04 | (2006.01) |
| B22F 10/20 | (2021.01) |
| B33Y 30/00 | (2015.01) |
| B29C 64/364 | (2017.01) |
| B29C 64/268 | (2017.01) |
| B29C 64/25 | (2017.01) |
| B08B 15/00 | (2006.01) |
| B28B 1/00 | (2006.01) |
| B28B 17/04 | (2006.01) |
| B33Y 40/00 | (2020.01) |
| B33Y 10/00 | (2015.01) |
| B29K 71/00 | (2006.01) |

(52) U.S. Cl.
CPC .............. *B22F 10/20* (2021.01); *B28B 1/001* (2013.01); *B28B 17/04* (2013.01); *B29C 64/153* (2017.08); *B29C 64/25* (2017.08); *B29C 64/268* (2017.08); *B29C 64/364* (2017.08); *B33Y 30/00* (2014.12); *B29K 2071/00* (2013.01); *B33Y 10/00* (2014.12); *B33Y 40/00* (2014.12)

(56) References Cited

FOREIGN PATENT DOCUMENTS

| | | |
|---|---|---|
| DE | 102014205875 A1 | 10/2015 |
| JP | 2006124732 A | 5/2006 |
| JP | 2016/527390 A | 9/2016 |
| JP | 2016/528374 A | 9/2016 |
| WO | WO2008052518 A1 | 5/2008 |
| WO | 2014199149 A1 | 12/2014 |
| WO | 2014199150 A1 | 12/2014 |

OTHER PUBLICATIONS

Machine Translated Japanese Search Report Corresponding to Application No. 2017553356 dated Nov. 27, 2018.
German Search Report Corresponding to Application No. 102015119747 dated Feb. 18, 2019.

DEVICE FOR THE GENERATIVE PRODUCTION OF A THREE-DIMENSIONAL OBJECT

CROSS-REFERENCE TO RELATED APPLICATIONS

This application is a United States national stage entry of an International Application serial no. PCT/EP2016/077230 filed Nov. 10, 2016 which claims priority to German Patent Application serial no. 10 2015 119 747.2 filed Nov. 16, 2015. The contents of these applications are incorporated herein by reference in their entirety as if set forth verbatim.

DESCRIPTION

The invention relates to an apparatus for the generative production of a three-dimensional object by successive, selective layer-by-layer solidification of construction material layers of a solidifiable construction material by means of at least one energy beam, comprising at least one device for generating at least one energy beam for selective layer-by-layer solidification of individual construction material layers of a solidifiable construction material, wherein the device is configured to generate an energy beam directed directly onto a construction plane.

Such apparatuses are known in and of themselves for the additive or generative production of three-dimensional objects. Appropriate apparatuses are used for additively or generatively building up three-dimensional objects to be produced by successive, selective layer-by-layer solidification by means of an energy beam of construction material layers of a solidifiable construction material applied in a construction plane in respective cross-sectional regions of the regions corresponding to the particular objects to be produced.

In the course of corresponding generative construction processes, non-solidified construction material particles ("weld or sinter spatter") may become detached from the construction plane or process gases, in particular smoke gases or fumes ("weld or sinter gases"), may arise. So as not to impair the generative construction process or the three-dimensional object to be produced, such construction material particles or process gases may be exhausted via an exhaust device.

There is a need for further development of corresponding exhaust devices with regard to a targeted or local possibility for exhausting construction material particles or process gases to be exhausted.

The object of the present invention is to provide an apparatus for the generative production of a three-dimensional object which is improved in particular with regard to a targeted or local possibility for exhausting construction material particles or process gases to be exhausted.

The object is achieved by an apparatus according to the claims. The claims dependent thereon relate to particular embodiments of the apparatus. The object is additionally achieved by an exhaust device and by a method according to the claims.

The apparatus described herein serves in general for the additive or generative production of at least one three-dimensional object, i.e. for example an industrial component or an industrial component assembly, by successive, selective layer-by-layer solidification of individual construction material layers of a solidifiable construction material by means of at least one energy beam generated by at least one device. The apparatus may be an apparatus for carrying out selective laser melting methods or selective laser sintering methods.

The successive, selective layer-by-layer solidification of a construction material layer to be solidified proceeds on the basis of object-related construction data. Corresponding construction data generally describe the geometric or geometric-structural shape of the particular three-dimensional object to be produced generatively (hereinafter "object" for short). Corresponding construction data may be or contain for example CAD data of the object to be produced.

The apparatus comprises the functional components typically required for carrying out generative construction processes, i.e. in particular an energy beam generation device, designated "device" for short, for generating an energy beam for successive, selective layer-by-layer solidification of individual construction material layers of a construction material, i.e. in particular a particulate or pulverulent metal, plastics and/or ceramic material, and a coater device for forming construction material layers to be solidified in a construction plane. The construction plane may be a surface of a carrier element, typically supported movably (in a vertical direction), of a carrier device or an already solidified construction material layer. In general, at least one construction material layer which is to be or has been selectively solidified is formed in a construction plane.

The device may comprise at least one, i.e. typically a plurality of, laser diode element(s) which is/are arrangeable or arranged directly above the construction plane and is/are configured to generate a laser beam directed directly onto the construction plane. The laser diode element(s) is/are here typically arranged within a construction or process chamber belonging to the apparatus and in which generative construction operations are carried out.

Alternatively or in addition, the device may comprise at least one, i.e. typically a plurality of, optical element(s) which is/are (optically) coupled with at least one laser diode element, is/are arrangeable or arranged directly above the construction plane and is/are configured to deflect a laser beam generated by the laser diode element directly onto the construction plane. The laser diode element(s) is/are here typically arranged outside a construction or process chamber belonging to the apparatus and in which generative construction operations are carried out. An optical element may take the form of or at least comprise a focusing optical system comprising one or more optical lens elements for focusing a laser beam onto the construction plane. An optical element and a laser diode element are (optically) coupled via a light guide element, for example in the form of one or more glass fiber cable(s). It is, of course, possible to couple at least one optical element with a plurality of laser diode elements or to couple at least one laser diode element via suitable beam splitting elements with a plurality of optical elements. Irrespective of the arrangement of the laser diode elements and the corresponding provision of coupled optical elements, laser beams generated by the device typically impinge on the construction plane at an angle of approx. 90° relative to the plane of the construction plane.

Such a device may be denoted or considered a "diode laser" since it comprises laser diode elements for generating energy or laser beams or such radiation. A laser diode element should be taken to be a semiconductor element configured to generate laser radiation. The characteristics, i.e. in particular the optical characteristics, i.e. for example the wavelength, of the laser beam which is generable by means of a laser diode element are inter alia dependent on the semiconductor material(s) used. Corresponding laser diode elements may for example generate emitted laser powers in the range between 0.1 and 10 watts; exceptionally, higher and/or lower outputs are, of course, conceivable.

The laser diode elements or optical elements belonging to the device may, as mentioned, be arranged directly in a construction or process chamber belonging to the apparatus and in which generative construction operations are carried out. The laser diode elements or optical elements may accordingly be arranged directly above the construction plane; no optical mask component is typically located between the laser diode elements or the optical elements and the construction plane. Accordingly, the laser beams generable or generated by means of the laser diode elements or the laser beams deflectable or deflected by means of the optical elements are directed directly onto the construction plane and impinge directly on the construction plane. It is not necessary to deflect the laser beams by means of a beam deflection device.

The laser diode elements or optical elements may be arranged on or in an in particular frame-like mounting device provided for this purpose. Such a, typically frame-like, mounting device comprises a number of predeterminable or predetermined arrangement positions, at or in which at least one laser diode element or at least one optical element is arrangeable. The laser diode elements or optical elements may be arrangeable or arranged as required, in particular detachably (without suffering damage or destruction) at predeterminable or predetermined arrangement positions in such a mounting device. Detachable connection of the laser diode elements or the optical elements to the mounting device may be convenient, for example in the case of a defect in a laser diode element or optical element, since the defective laser diode element or optical element may be straightforwardly removed from the mounting device and replaced. The mounting device is typically dimensioned such that it is straightforwardly arrangeable in a construction or process chamber of the apparatus.

The apparatus further comprises an exhaust device, which is configured to exhaust process-related construction material ("weld or sinter spatter"), i.e. non-solidified construction material detached from the construction plane or from a fused- or melted-on region of the construction plane while a generative construction process is carried out and/or process-related process gases (weld or sinter gases), i.e. process gases arising while a generative construction process is carried out, such as for example smoke gases or fumes. The exhaust device of course comprises at least one connection element for connecting the exhaust device to a suction flow source, i.e. for example a pump device, generating a suction flow. A corresponding suction flow source may form a component part of the exhaust device.

Construction material contained in the suction flow may be separated, in particular filtered, out of the suction flow by means of a separating direction, in particular a filter device, and reused in the course of a generative construction process, optionally after construction material-specific reprocessing. A corresponding separating device may form a component part of the apparatus.

The exhaust device comprises at least one exhaust element through which a suction flow, i.e. for example an, optionally inert, suction fluid stream, may or does flow when the apparatus is in operation. To enable throughflow of the suction flow, a corresponding exhaust element comprises at least one inner or flow chamber. Such an inner or flow chamber may be denoted or considered a flow channel.

At least one passage opening, e.g. in the form of a bore, is formed in the at least one exhaust element for the passage of an energy beam generated by the device and directed directly onto the construction plane. To enable passage of a corresponding energy beam through a corresponding passage opening, the passage opening accordingly extends in the direction of extension of the energy beam, i.e. in particular perpendicularly relative to the construction plane, through the exhaust element.

The formation of corresponding passage openings enables targeted or local exhausting of non-solidified construction material particles detached from the construction plane during processing or of process gases arising during processing in the region where they arise, i.e. in particular at the location of the energy input proceeding by means of the energy beam impinging on the construction plane. Construction material or process gas ascending from the construction plane is drawn through corresponding passage openings into the inner or flow chamber encompassed by the exhaust element and through which the suction flow flows and removed immediately from the apparatus, at least from a construction or process chamber in the apparatus. Respective passage openings in the exhaust element lead in this respect into a respective flow or inner chamber defined in the exhaust element or communicate with such. Exhausting "weld or sinter spatter" results in improved quality of the object to be produced.

It is of course possible for an exhaust element to comprise a plurality of passage openings. Each passage opening may be associable or associated with an energy beam generable or generated by the device and directed directly onto the construction plane. It is also conceivable, insofar as the exhaust device comprises a plurality of exhaust elements, for each exhaust element to comprise just one (single) passage opening which is associated with a specific energy beam generated by the device and directed directly onto the construction plane. Consequently, insofar as the device takes the form of a "diode laser", a laser diode element may be associable or associated with each passage opening, such that the laser beam generated by a laser diode element associated with a specific passage opening passes through the passage opening associated therewith.

A corresponding exhaust element may have an elongate, in particular tube-like or tubular, in general hollow(-cylindrical), geometric shape. These may also include funnel-shaped geometric configurations of corresponding exhaust elements, the cross-section(al area) of which expands or reduces in the direction of flow. In any event, the at least one passage opening in the exhaust element is configured to extend through the exhaust element across the longitudinal extent thereof. The suction flow accordingly flows through the exhaust element lengthwise, i.e. parallel to the longitudinal extent thereof. In principle, the exhaust element may have any desired cross-sectional geometry. The flow characteristics, in particular the flow velocity, of the suction flow may be influenced in a targeted manner by targeted influencing of the cross-sectional geometry, i.e. in particular targeted expansion or reduction of the cross-sectional area (Venturi principle). The above-mentioned funnel-shaped geometric shape of the exhaust element may contribute to this.

An exhaust element, i.e. in particular an exhaust element having a corresponding elongate, optionally funnel-shaped, geometric shape, is conveniently arranged or formed above the construction plane and extending parallel to the construction plane. The distance between the exhaust element and the construction plane may be comparatively small. The efficiency with which construction material or process gases are exhausted may be increased by comparatively small distances between the exhaust element and the construction plane. Specifically, the distance between an exhaust element and the construction plane may for example lie in a range of between 1 and 10 cm, in particular below 5 cm. As is explained in greater detail below, an exhaust element may be movably supported in at least one degree of freedom of movement relative to the construction plane, such that the distance between an exhaust element and the construction plane may be variably modifiable. Equally, an exhaust element may in this way be moved as required out of the trajectory of a coater device, such that it does not hinder the coater device during coating operations.

As mentioned, the exhaust device may comprise a plurality of exhaust elements. The efficiency with which construction material or process gases are exhausted may also be increased by the targeted provision, i.e. in particular arrangement and/or interconnection, of a plurality of exhaust elements. Through a suitable selection of the number and arrangement of a plurality of exhaust elements, the exhaust device may be straightforwardly adapted to any desired number of radiation sources, i.e. in particular laser diode elements, or arbitrarily shaped construction or process chambers or arbitrarily shaped construction planes.

In relation to the arrangement of the exhaust elements, it is possible for at least one first exhaust element to be arranged or formed in a first orientation relative to the construction plane and for at least one further or second exhaust element to be arranged or formed parallel or at an angle, in particular perpendicular, to the first exhaust element. It is in particular possible to form groups of identically oriented parallel first exhaust elements and groups of identically oriented parallel further or second exhaust elements. A grid (network)-like arrangement of exhaust elements intersecting at intersection points may therefore for example be formed, wherein a first group comprises a plurality of first exhaust elements arranged parallel to one another which are each arranged or formed in a first orientation relative to the construction plane, and at least one second or further group comprises a plurality of second or further exhaust elements arranged parallel to one another which are each arranged or formed in a further or second orientation extending at an angle, in particular perpendicular, to the first orientation.

An elongate, in particular tube-like or tubular, exhaust element may comprise at least one flow portion which may be flowed through by a suction flow, in particular is tube-like or tubular, and at least one suction or passage portion provided with at least one passage opening, wherein the at least one flow portion and the at least one exhaust portion communicate with one another via at least one connecting portion, such that non-solidified construction material exhausted via the passage opening and detached from the construction plane during processing and/or process gas arising during processing passes into the flow portion via the connecting portion. The corresponding provision of separate flow and exhaust portions may be convenient with regard to exhaust element deposits or impurities which form from time to time. The connecting portion between a respective flow and exhaust portion may be bent or curved.

Adjusting devices, for example in the form of or comprising valve devices, which as required shut off or open up the connection between respective flow and exhaust portions, may be connected into the connecting portion. A convenient embodiment provides an exhaust portion communicating with a plurality of flow portions. This makes it possible, for example, to shut off the connection between a first flow portion and an exhaust portion, in order to clean the first flow portion of deposits, impurities, etc., for example by rinsing with a cleaning fluid, wherein it remains possible to exhaust construction material and/or process gases via a further flow portion.

In addition to an elongate, in particular tube-like or tubular, optionally funnel-shaped, geometric shape, an exhaust element may also have a plate-like or plate-shaped geometric shape. Specifically, an exhaust element may accordingly also take the form of an exhaust plate comprising at least one passage opening and passed through by a flow channel structure. A corresponding exhaust plate or a corresponding flow channel structure comprises a number of, optionally intercommunicating, flow channels, which extend through the exhaust plate. Typically, at least one passage opening leads into a respective flow channel. A corresponding exhaust plate is typically arranged or formed above the construction plane and extending parallel to the construction plane.

The area of a corresponding exhaust plate is dimensioned in such a way in its geometric dimensions that it covers at least part of the area of the construction plane, in particular the entire area of the construction plane. Coverage of the entire area of the construction plane may be convenient with regard to optimum exhausting of corresponding construction material particles or process gases.

Irrespective of their specific geometric shape, the exhaust elements typically extend in a plane extending parallel to the construction plane. It is nonetheless also conceivable for a plurality of exhaust elements to be arranged one above the other, in particular offset relative to one another, in a plurality of planes each typically extending parallel to the construction plane. The, in particular offset, arrangement of exhaust elements one above the other in a plurality of planes may be structurally particularly compact and thus result in a particularly efficient exhaust device with regard to exhaust capacity per unit area or volume.

Again irrespective of the specific geometric shape thereof, at least two exhaust elements may communicate or be connected directly with one another or communicate or be connected indirectly with one another through the interposition of at least one connecting element connecting them and likewise through which a suction flow may or does flow during operation of the apparatus. A branched flow channel structure may be formed by exhaust elements connected together by means of respective connection elements or inner chambers in each case delimited by said exhaust elements and through which a suction flow may or does flow. The structure of the exhaust device may be simplified with such a configuration, as the number of connecting elements for connecting the exhaust device to a suction flow source generating a suction flow may be reduced.

It has already been mentioned further above that an exhaust element may be movably supported in at least one degree of freedom of movement relative to the construction plane. The exhaust element is moved by means of a suitable, i.e. in particular (electric) motor-powered, drive and/or guidance device couplable or coupled therewith. Movement of an exhaust element may include translational degrees of freedom of movement along at least one axis of translation and/or rotational degrees of freedom of movement about at least one axis of rotation. The movement of an exhaust element may accordingly for example be a linear, rotary, tilt or pivot movement. Combined movements in a plurality of different degrees of freedom of movement are, of course, possible.

Movable support of an exhaust element is in particular convenient in conjunction with likewise movable support of laser diode elements. Movable support of laser diode elements may in turn be embodied in that the laser diode elements are arranged on or in a mounting device provided therefor and likewise supported movably in at least one degree of freedom of movement relative to the construction plane.

Such a mounting device is also moved by way of a suitable, i.e. in particular (electric) motor-powered drive and/or guidance device couplable or coupled therewith. This may of course be the same drive and/or guidance device by means of which an exhaust element is also moved relative to the construction plane. By moving the mounting device, it is possible to move the mounting device together with laser diode elements arranged thereon or therein relative to the construction plane to be exposed with regard to a specific exposure situation. Similarly to the movement of an exhaust element, the movement of the mounting device may also include translational degrees of freedom of movement along at least one axis of translation and/or rotational degrees of freedom of movement about at least one axis of rotation. The movement of the mounting device may accordingly for example likewise be a linear, rotary, tilt or pivot movement. Combined movements in a plurality of different degrees of freedom of movement are, of course, likewise possible.

The movements of an exhaust element and a mounting device may be adapted to one another by way of a suitable control device in such a way that the relative position of respective laser diode elements arranged on or in the mounting device and respective passage openings in the exhaust element allows passage of the laser beams generable or generated by the laser diode elements through respective passage openings in the exhaust element. In particular, the movements of an exhaust element and a mounting device may be adapted in such a way that the relative positions of mutually associated passage openings and laser diode elements remain unchanged.

Movements of the exhaust element or the mounting device may take place simultaneously with irradiation of the construction plane. In connection with the irradiation of the construction plane, the exhaust elements and/or the mounting device may also be moved in different degrees of freedom of movement or in different trajectories relative to the construction plane. In this manner, different solidification structures, i.e. for example weld seams, may be formed in the construction material layer to be solidified and internal stresses in the object to be produced may be reduced, which has a positive impact on the quality of the object to be produced. The exhaust element and/or the mounting device may initially, for example, be moved over the construction plane for example along a first trajectory defined by a first, for example linear, movement axis and subsequently over the construction plane along a further trajectory defined by a further, for example linear, movement axis. The further trajectory may extend for example at an angle, in particular orthogonally, to the first trajectory.

In the event that a mounting device is not movably supported relative to the construction plane, the device may comprise a plurality of laser diode elements or optical elements which cover at least a part or a subarea of the construction plane, in particular the complete construction plane. In particular where the complete area of the construction plane is covered by an arrangement of laser diode elements or optical elements which corresponds in area, it is not necessary to move the mounting device together with laser diode elements or optical elements arranged thereon or therein relative to the construction plane with regard to a specific exposure situation. In this case, there is no need to provide any drive and/or guidance devices couplable or coupled with the mounting device, which optionally simplifies the structure of the apparatus in plant and control terms.

Irrespective of whether a corresponding mounting device is supported movably or immovably relative to the construction plane, at least one laser diode element or at least one optical element may (also) be arrangeable or arranged on or in the mounting device in at least one degree of freedom of movement relative to the mounting device and thus also movably relative to the construction plane. By moving individual, a plurality of or all of the laser diode elements or optical elements relative to the mounting device, it is for example possible to move the laser diode elements or optical elements relative to the construction plane with regard to a specific exposure situation. It is likewise possible to move, i.e. in particular to tilt or pivot, individual, a plurality of or all of the laser diode elements or optical elements into a deactivated state in which a respective generable or generated laser beam is directed away from the construction plane. Movement of a laser diode element or optical element may also include translational degrees of freedom of movement along at least one axis of translation and/or rotational degrees of freedom of movement about at least one axis of rotation. The movement of a laser diode element or an optical element may accordingly also for example be a linear, rotary, tilt or pivot movement. Combined movements in a plurality of different degrees of freedom of movement are, of course, possible here too.

Movements of the laser diode elements or optical elements may likewise proceed simultaneously with exposure of the construction plane. Individual, a plurality of or all of the laser diode elements or optical elements may also be moved in connection with irradiation of the construction plane in different degrees of freedom of movement or in different trajectories relative to the construction plane. In this manner also, different solidification structures, i.e. for example weld seams, may be formed in the construction material layer to be solidified and internal stresses arising during processing in the object to be produced may be reduced, which has a positive impact on the quality of the object to be produced. Individual, a plurality of or all of the laser diode elements or optical elements may initially be moved over a construction plane for example along a first trajectory defined by a first, for example linear, movement axis and subsequently over the construction plane along a further trajectory defined by a further, for example linear, movement axis. The further trajectory may extend for example at an angle, in particular orthogonally, to the first trajectory.

The invention further relates to an exhaust device for an apparatus (as described) for the generative production of a three-dimensional object by successive, selective layer-by-layer solidification of construction material layers of a solidifiable construction material by means of at least one energy beam, comprising at least one device for generating at least one energy beam for layer-by-layer selective solidification of individual construction material layers of a solidifiable construction material, wherein the device is configured to generate an energy beam directed directly onto the construction plane. The exhaust device is configured to exhaust non-solidified construction material detached from the construction plane during processing and/or process gases arising during processing and is distinguished in that it comprises at least one exhaust element through which a suction flow may or does flow, wherein at least one passage opening is formed in the at least one exhaust element for passage of an energy beam generated by a device in the apparatus and directed directly onto the construction plane.

All the explanations given in connection with the apparatus likewise apply to the exhaust device.

Moreover, the invention relates to a method for the generative production of at least one three-dimensional object by successive, selective layer-by-layer solidification of individual construction material layers of a solidifiable construction material by means of an energy beam generated by a radiation generation device. The method is distinguished in that an exhaust device as described is used for exhausting non-solidified construction material detached from the construction plane during processing and/or process gases arising during processing. All the explanations given in connection with the apparatus also likewise apply to the method.

The invention is explained in greater detail on the basis of exemplary embodiments in the drawings, in which.

Figure 1:
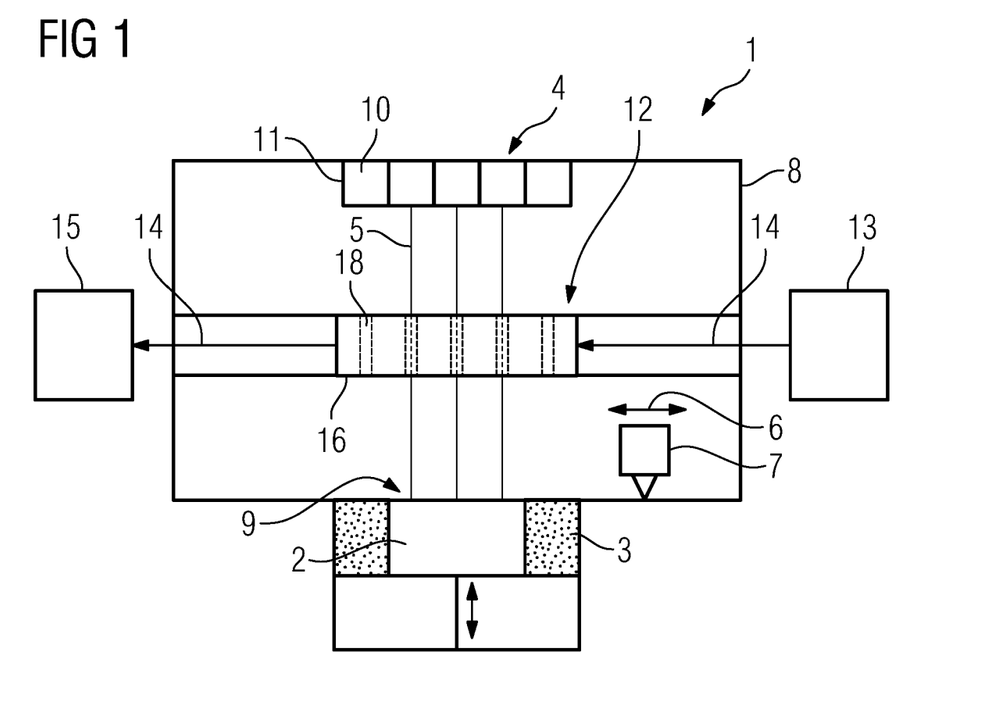
FIGS. 1-7 each show a schematic diagram of an apparatus for the generative production of a three-dimensional object according to an exemplary embodiment.

FIG. 1 shows a schematic diagram of an apparatus 1 according to an exemplary embodiment. The apparatus 1 serves for the generative production of a three-dimensional object 2, i.e. for example an industrial component or an industrial component assembly, by successive, selective layer-by-layer solidification of construction material layers of a solidifiable construction material 3 by means of at least one energy or laser beam 5 generated by a device 4 (laser beam generation device).

The successive, selective layer-by-layer solidification of respective construction material layers to be solidified proceeds in that one or more laser beams 5 generated by the device 4 are selectively directed onto specific regions to be solidified of construction material layers corresponding to respective layer-related cross-sectional geometries of the object 2 to be produced.

Respective construction material layers to be solidified are formed by means of a coater device 7 which is supported movably, as indicated by the horizontally oriented arrow 6, in a construction chamber 8 of the apparatus 1. A protective gas atmosphere, i.e. for example an argon or nitrogen atmosphere, typically prevails in the construction chamber 8.

The solidifiable construction material 3 may be a metal powder (mixture), i.e. for example an aluminum powder, and/or a plastics powder (mixture), i.e. for example a polyether ether ketone powder, and/or a ceramic powder (mixture), i.e. for example an alumina powder.

The device 4 is arranged directly in the construction chamber 8 and, for generating laser beams 5, comprises a plurality of laser diode elements 10 which are for example arranged in a matrix, i.e. in rows and columns, and which are each configured for generating a laser beam 5 directed directly onto the construction plane 9. The laser beams 5 generated by means of the laser diode elements 10 accordingly impinge on the construction plane 9 at an angle of 90° relative to the plane of the construction plane. The device 4 may be denoted or considered a "diode laser".

The laser diode elements 10 are arranged on or in an, in particular frame-like, mounting device 11 provided for this purpose. The mounting device 11 comprises a number of predeterminable or predetermined arrangement positions, on or in which at least one laser diode element 10 is arrangeable. The laser diode elements 10 are arrangeable or arranged as required, in particular detachably (without suffering damage or destruction), at predeterminable or predetermined arrangement positions in the mounting device 11.

The apparatus 1 further comprises an exhaust device 12, which is configured to exhaust process-related construction material ("weld or sinter spatter"), i.e. non-solidified construction material 3 detached from the construction plane 9 or from a fused- or melted-on region of the construction plane 9 while a generative construction process is carried out and/or process-related process gases, i.e. process gases arising while a generative construction process is carried out, i.e. for example smoke gases or fumes. The exhaust device 12 is connected via a connection element, not shown in any greater detail, to a suction flow source 13, i.e. for example a pump device, generating a suction flow indicated by the arrow 14. The suction flow comprises an, optionally inert, suction fluid stream, i.e. for example an argon or nitrogen stream.

Construction material 3 contained in the suction flow may be separated, in particular filtered, out of the suction flow by means of a separating device 15, in particular a filter device, and reused in the course of carrying out generative construction processes, optionally after construction material-specific reprocessing.

Figure 3:
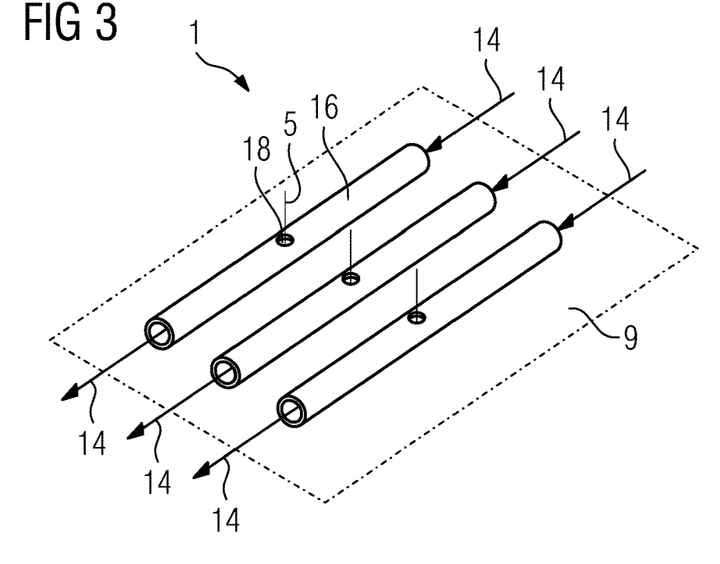
Figure 4:
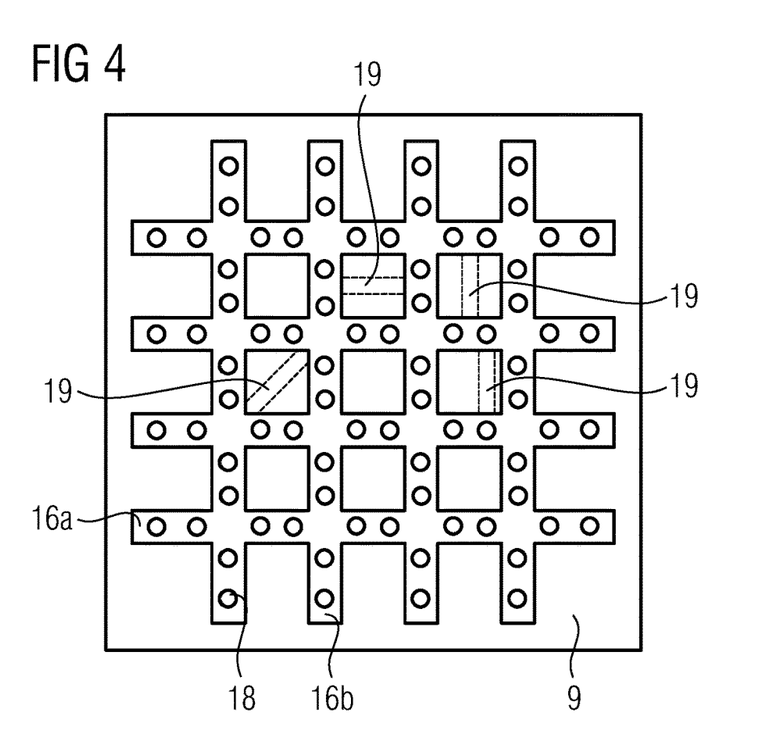

The exhaust device 12 comprises at least one exhaust element 16 through which the suction flow flows. Different exemplary embodiments of corresponding exhaust elements 16 are shown in FIGS. 2-4.

Figure 2:
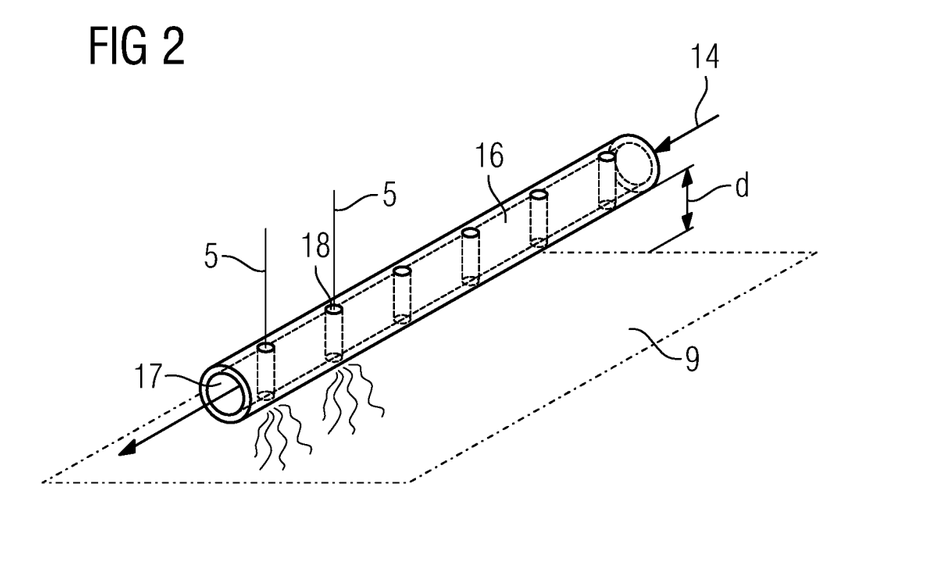

It is apparent on the basis of the exemplary embodiment shown in FIG. 2 that an exhaust element 16 defines an inner or flow chamber 17. Such an inner or flow chamber 17 may be denoted or considered a flow channel. It is moreover apparent from FIG. 2 that a plurality of passage openings 18, for example in the form of bores, are formed in an exhaust element 16 for the respective passage of a laser beam 5 generated by the device 4 and directed directly onto the construction plane 9. Respective passage openings 18 lead into the inner or flow chamber 17 in the exhaust element. To enable passage of a corresponding laser beam 5 through a corresponding passage opening 18, the passage openings 18 extend through the exhaust element 16 in the direction of extension of the laser beams 5, i.e. in particular perpendicularly relative to the construction plane 9.

The formation of corresponding passage openings 18 enables targeted or local exhausting of non-solidified construction material particles detached from the construction plane 9 during processing or of process gases arising during processing in the region where they arise, i.e. in particular at the location of the energy input proceeding by means of the laser beam 5 impinging on the construction plane 9. Construction material or process gas ascending from the construction plane 9 is drawn through corresponding passage openings 18 into the inner or flow chamber 17 defined by an exhaust element 16 and through which the suction flow flows and is immediately removed from the apparatus 1, at least from the construction chamber 8. Exhausting "weld or sinter spatter" results in improved quality of the object 2 to be produced.

Each passage opening 18 is associable or associated with a laser beam 5 generable or generated by the device 4 and directed directly onto the construction plane 9. Each passage opening 18 is accordingly associable or associated with a laser diode element 10, such that the laser beam 5 generated by a laser diode element 10 associated with a specific passage opening 18 passes through the passage opening 18 associated therewith In the exemplary embodiment shown in FIG. 2, the exhaust element 16 comprises an elongate, in particular tube-like or tubular, in general hollow(-cylindrical), geometric shape with a for example round or roundish cross-sectional geometry. Respective passage openings 18 in the exhaust element are configured to extend through the respective exhaust element 16 across the longitudinal extent of the respective exhaust element 16. The suction flow flows through the exhaust element 16 lengthwise, i.e. parallel to the longitudinal extent thereof.

The exhaust element 16 is arranged above the construction plane 9 and extending parallel to the construction plane 9. The distance d between the exhaust element 16 and the construction plane 9 may be comparatively small. The efficiency with which construction material 3 or process gases are exhausted may be increased by comparatively small distances d between the exhaust element 16 and the construction plane 9. Specifically, the distance d between the exhaust element 16 and the construction plane 9 may for example lie in a range of between 1 and 10 cm, in particular below 5 cm.

Figure 5:
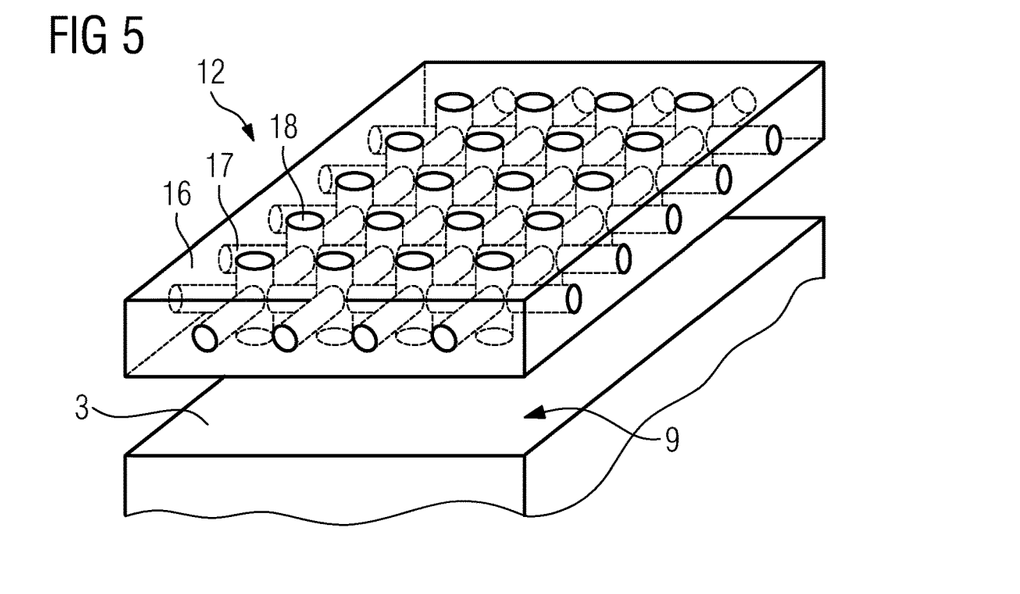

The exhaust element 16 may be movably supported in at least one degree of freedom of movement relative to the construction plane 9, such that the distance d between an exhaust element 16 and the construction plane 9 may be variably modifiable (cf. FIG. 5 with associated description). Equally, the exhaust element 16 may in this way be moved as required out of the trajectory of a coater device 7, such that it does not hinder the latter during coating operations.

FIG. 3 shows an exemplary embodiment of a plurality of adjacently arranged exhaust elements 16, i.e. exhaust elements 16 typically arranged in parallel, which in contrast with the exemplary embodiment shown in FIG. 2, have each been provided with just one (single) passage opening 18. A respective passage opening 18 in the exhaust element is associated with a specific energy beam 5 generated by the device 4 and directed directly onto the construction plane 9 and thus a specific laser diode element 10.

On the basis of FIG. 4, which shows a plan view onto the construction plane 9, it is apparent that the exhaust device 12 may comprise a plurality of exhaust elements 16. Through a suitable selection of the number and arrangement of a plurality of exhaust elements 16, the exhaust device 12 may be straightforwardly adapted to any desired number of radiation sources, i.e. in particular laser diode elements 10, or arbitrarily shaped construction chambers 8 or arbitrarily shaped construction planes 9.

The exemplary embodiment shown in FIG. 4 shows first exhaust elements 16a, which are arranged extending in a first orientation (horizontal orientation) relative to the construction plane 9, and second exhaust elements 16b, which are at an angle, in particular perpendicular, to the first exhaust elements 16a.

It is accordingly possible to form groups of identically or parallel oriented first exhaust elements 16a and groups of identically or parallel oriented second exhaust elements 16b. The grid (network)-like arrangement shown in FIG. 3 of exhaust elements 16a, 16b intersecting at intersection points may result therefrom. In this case, a first group comprises a plurality of first exhaust elements 16a arranged or oriented parallel to one another which are each arranged or formed in a first orientation relative to the construction plane 9, and a second group comprises a plurality of second exhaust elements 16b arranged or oriented parallel to one another which are each arranged or formed in a further or second orientation extending at an angle, in particular perpendicular, to the first orientation.

It is apparent from FIG. 4 that at least two exhaust elements 16, 16a, 16b may communicate or be connected directly with one another. The broken lines additionally indicate the possibility that at least two exhaust elements 16, 16a, 16b may communicate or be connected indirectly with one another through the interposition of at least one connecting element 19 connecting them and likewise through which a suction flow flows. A branched flow channel structure may be formed by exhaust elements 16, 16a, 16b connected together by means of respective connection elements 19 or inner or flow chambers 17 in each case delimited by said exhaust elements and through which a suction flow may or does flow.

The exemplary embodiment shown in FIG. 5 in a perspective view of a portion of the construction chamber 8 of the apparatus 1 reveals that an exhaust element 16 may also have a plate-like or plate-shaped geometric shape. The exhaust element 16 shown in FIG. 5 is configured as an exhaust plate through which pass a plurality of passage openings 18 arranged in a matrix, i.e. in rows and columns, of a flow channel structure. The exhaust plate comprises a number of, mutually communicating, channel-like inner or flow chambers 17 shown by broken lines, which form a flow channel structure and extend through the exhaust plate. It is apparent that at least one passage opening 18 leads into a respective inner or flow chamber 17. The inner or flow chambers 17 may be denoted or considered flow channels.

The area of the exhaust plate is dimensioned in such a way in its geometric dimensions that it covers the entire area of the construction plane 9. Coverage of the entire area of the construction plane 9 is convenient with regard to optimum exhausting of corresponding construction material particles or process gases.

The figures each show an arrangement of the exhaust elements 16 extending parallel to the construction plane 9. It is nonetheless also conceivable for a plurality of exhaust elements 16 to be arranged one above the other, in particular offset relative to one another, in a plurality of planes each typically extending parallel to the construction plane 9.

Figure 6:
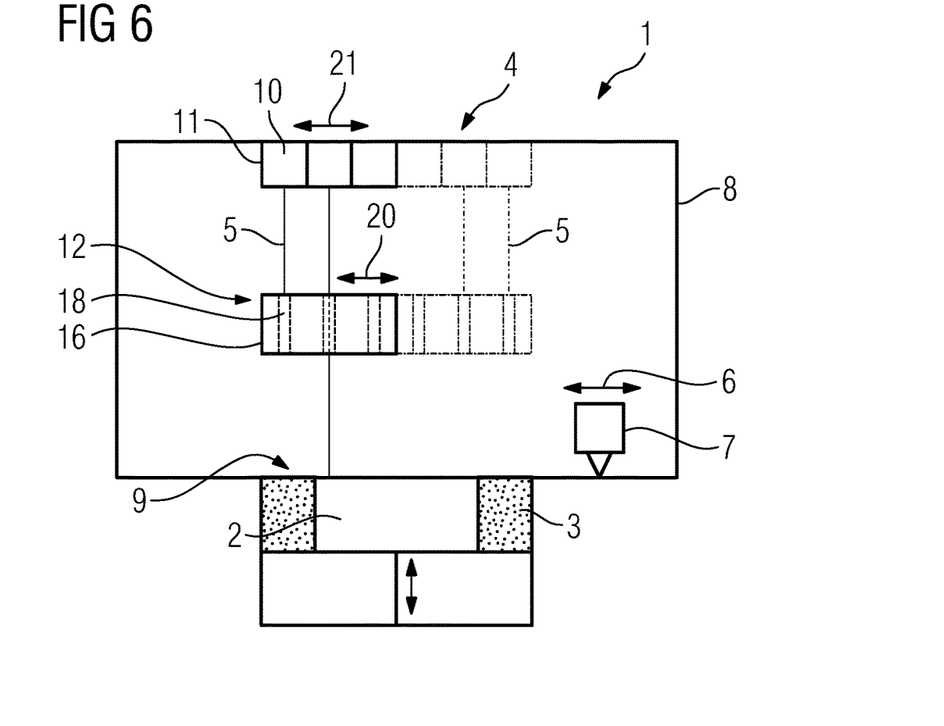

It should be explained with reference to the exemplary embodiment shown in FIG. 6 that an exhaust element 16, as mentioned, may be movably supported in at least one degree of freedom of movement relative to the construction plane 9. The movable support of an exhaust element 16 is in principle independent of the geometric shape thereof. Movements of the exhaust element 16 take place by means of a suitable, i.e. in particular (electric) motor-powered, drive and/or guidance device (not shown) couplable or coupled therewith. In the exemplary embodiment shown in FIG. 6, movement of the exhaust element 16 includes translational movement along the axis of translation indicated by the double-headed arrow 20. The exhaust element 16 is shown by broken lines in a second position, into which it was moved from a first position. In principle, movement of an exhaust element 16 may include translational degrees of freedom of movement along an axis of translation and/or rotational degrees of freedom of movement about an axis of rotation. Combined movements in a plurality of different degrees of freedom of movement are, of course, possible.

Movable support of an exhaust element 16 is in particular convenient in conjunction with likewise movable support of laser diode elements 10. Movable support of laser diode elements 10 is achieved in the exemplary embodiment shown in FIG. 6 in that the laser diode elements 10 are arranged on or in a mounting device 11 supported relative to the construction plane 9 and likewise movable in at least one degree of freedom of movement.

Movements of the mounting device 11 likewise take place by means of a suitable, i.e. in particular (electric) motor-powered, drive and/or guidance device (not shown) couplable or coupled therewith. This may of course be the same drive and/or guidance device by means of which the exhaust element 16 is also moved relative to the construction plane 9. In the exemplary embodiment shown in FIG. 6, movement of the mounting device 11 includes translational movement along the axis of translation indicated by the double-headed arrow 21. The mounting device 11 is shown by broken lines in a second position, into which it was moved from a first position. Similarly to the movement of an exhaust element 16, the movement of the mounting device 11 may also include translational degrees of freedom of movement along an axis of translation and/or rotational degrees of freedom of movement about an axis of rotation. Combined movements in a plurality of different degrees of freedom of movement are, of course, likewise possible.

Movements of the exhaust element 16 and the mounting device 11 may be adapted to one another by way of a suitable control device (not shown) in such a way that the relative position of respective laser diode elements 10 arranged on or in the mounting device 11 and respective passage openings 18 in the exhaust element allows passage of the laser beams 5 generable or generated by the laser diode elements 10 through respective passage openings 18 in the exhaust element. In particular, the movements of the exhaust element 16 and the mounting device 11 may be adapted in such a way that the relative positions of mutually associated passage openings 18 and laser diode elements 10 remain unchanged.

Movements of the exhaust element 16 or the mounting device 11 may take place simultaneously with irradiation of the construction plane 9. In connection with the irradiation of the construction plane 9, the exhaust element 16 and/or the mounting device 11 may also be moved in different degrees of freedom of movement or in different trajectories relative to the construction plane 9. In this manner, different solidification structures, i.e. for example weld seams, may be formed in the construction material layer to be solidified and internal stresses in the object 2 to be produced may be reduced, which has a positive impact on the quality of the object 2 to be produced. The exhaust element 16 and/or the mounting device 11 may initially, for example, be moved over the construction plane 9 for example along a first trajectory defined by a first, for example linear, movement axis and subsequently over the construction plane 9 along a further trajectory defined by a further, for example linear, movement axis. The further trajectory may extend for example at an angle, in particular orthogonally, to the first trajectory.

Figure 7:
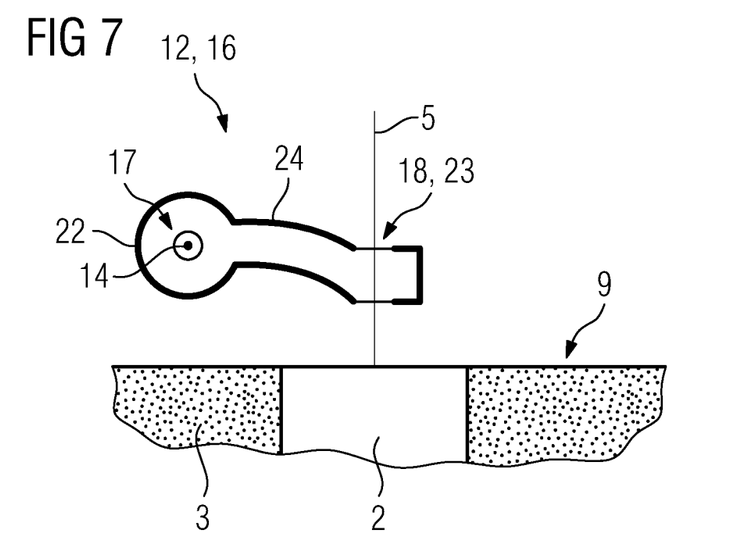

FIG. 7 shows a further exemplary embodiment of an exhaust element 16. The exhaust element 16 shown in cross-sectional view in FIG. 7 likewise has an elongate geometric shape. The exhaust element 16 comprises a tube-like or tubular flow portion 22 through which a suction flow may flow and an exhaust portion 23 provided with at least one passage opening 18. A plurality of corresponding exhaust portions 23 could of course be present. The flow portion 22 defines an inner or flow chamber 17. The flow portion 22 and the exhaust portion 23 are connected together via a connecting portion 24, such that construction material 3 and/or process gas exhausted via the passage opening 18 arrives by way of the connecting portion 24 into the flow portion 22. The connecting portion 24 may, as shown in FIG. 7 by way of example, be bent or curved in the manner of an "elbow".

Figure 8:
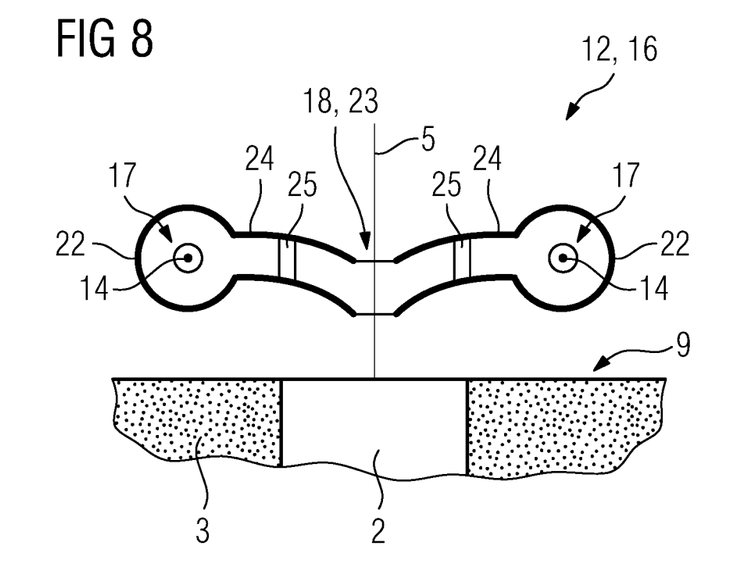
FIG. 8 shows a schematic diagram of an exhaust element for an apparatus for the generative production of a three-dimensional object according to an exemplary embodiment.

FIG. 8 shows a further exemplary embodiment of an exhaust element 16, which, in contrast with the exemplary embodiment shown in FIG. 7, comprises two flow portions 22. Two adjusting devices 25 in the form of valve devices, which as required shut off or open up the connection between a respective flow portion 22 and the exhaust portion 23, may be connected into the connecting portion 24. This makes it possible to shut off the connection between a first flow portion 22 and the exhaust portion 23, in order to clean the first flow portion 22 of deposits, impurities, etc., for example by rinsing with a cleaning fluid, wherein it remains possible to exhaust construction material 3 and/or process gases via the other flow portion 23.

By means of the apparatuses 1 shown in the exemplary embodiments shown in the figures, it is possible to implement a method for the generative production of an object 2 by successive, selective layer-by-layer solidification of individual construction material layers of a solidifiable construction material 3 by means of a laser beam 5. The method may in principle be a selective laser welding method or a selective laser sintering method. The method is distinguished in that a corresponding exhaust device 12 is used for exhausting non-solidified construction material 3 detached from the construction plane 9 during processing and/or process gases arising during processing.

LIST OF REFERENCE NUMERALS

1 Apparatus
2 Object
3 Construction material
4 Device
5 Laser beam
6 Double-headed arrow
7 Coater device
8 Construction chamber
9 Construction plane
10 Laser diode element
11 Mounting device
12 Exhaust device
13 Suction flow source
14 Arrow
15 Separating device
16 Exhaust element
16a Exhaust element
16b Exhaust element
17 Inner or flow chamber
18 Passage opening
19 Connection element
20 Double-headed arrow
21 Double-headed arrow
22 Flow portion
23 Exhaust portion
24 Connecting portion
d Distance

The invention claimed is:

1. An apparatus for the generative production of a three-dimensional object by successive, selective layer-by-layer solidification of construction material layers of a solidifiable construction material with at least one energy beam, the apparatus comprising:
at least one device configured to generate at least one energy beam for selective layer-by-layer solidification of individual construction material layers of a solidifiable construction material, wherein the at least one energy beam is directed directly onto a construction plane, and
an exhaust device configured to exhaust non-solidified construction material detached from the construction plane during processing and/or process gases arising during processing, wherein the exhaust device comprises at least one exhaust element through which a suction flow may or does flow, wherein the at least one exhaust element comprises an inner flow chamber defining a flow channel for the suction flow and at least one passage opening leading into the inner flow chamber and extending through a longitudinal extent of the at least one exhaust element, wherein the at least one passage opening is formed in the at least one exhaust element for passage of an energy beam generated by the device and directed directly onto the construction plane perpendicular to the longitudinal extent of the at least one exhaust element.

2. The apparatus as claimed in claim 1, wherein the device is configured to generate the at least one laser beam directed directly onto the construction plane, wherein the device comprises:
at least one laser diode element arrangeable or arranged above the construction plane, wherein construction material layers which are to be or have been selectively solidified are formed, and/or
the at least one laser diode element arranged outside a construction chamber of the apparatus and at least one optical element which is optically coupled with the at least one laser diode element arranged outside the construction chamber and is arrangeable or arranged directly above the construction plane, in which construction material layers which are to be or have been selectively solidified are formed, wherein the at least one optical element is configured for deflecting a laser beam generated by the laser diode element directly onto the construction plane.

3. The apparatus as claimed in claim 2, wherein the device comprises a plurality of laser diode elements and/or optical elements, wherein the laser diode elements and/or the optical elements cover at least a part of the area of the construction plane.

4. The apparatus as claimed in claim 1, wherein the at least one exhaust element has an elongate wherein the at least one passage opening is configured to extend through the at least one exhaust element across the longitudinal extent thereof.

5. The apparatus as claimed in claim 1, wherein the at least one exhaust element has an elongate, tube-like geometric shape, wherein it is arranged or formed above the construction plane and extending parallel to the construction plane.

6. The apparatus as claimed in claim 1, wherein the exhaust device comprises a plurality of elongate, tube-like exhaust elements.

7. The apparatus as claimed in claim 6, wherein each exhaust element comprises a passage opening, which is associated with a specific energy beam generated by the device and directed directly onto the construction plane.

8. The apparatus as claimed in claim 1, wherein at least one first exhaust element is arranged or formed in a first orientation relative to the construction plane and at least one second exhaust element is arranged or formed perpendicular to the first exhaust element.

9. The apparatus as claimed in claim 1, wherein at least two exhaust elements are connected directly together or are connected indirectly together by at least one connection element connecting them.

10. The apparatus as claimed in claim 1, wherein the at least one exhaust element comprises at least one flow portion through which a suction flow may flow and at least one exhaust portion provided with at least one corresponding passage opening, wherein the at least one flow portion and the at least one exhaust portion communicate with one another, such that non-solidified construction material exhausted via the passage opening and detached from the construction plane during processing and/or process gas arising during processing passes into the flow portion via the connecting portion.

11. The apparatus as claimed in claim 1, wherein at least one exhaust element is configured as an exhaust plate, which comprises the at least one passage opening, through which passes a flow channel structure and which is arranged or formed above the construction plane and extending parallel to the construction plane.

12. The apparatus as claimed in claim 11, wherein the exhaust plate covers at least part of the area of the construction plane.

13. The apparatus as claimed in claim 1, wherein at least two exhaust elements are arranged one above the other in a plurality of planes.

14. The apparatus as claimed in claim 1, wherein at least one exhaust element is movably supported in at least one degree of freedom of movement relative to the construction plane.

15. The apparatus as claimed in claim 1, wherein each passage opening in the exhaust element is associable or associated with an energy beam generated by the device and directed directly onto the construction plane.

16. An exhaust device for an apparatus for the generative production of a three-dimensional object by successive, selective layer-by-layer solidification of construction material layers of a solidifiable construction material with at least one energy beam, the apparatus comprising at least one device for producing at least one energy beam for layer-by-layer selective solidification of individual construction material layers of a solidifiable construction material, wherein the device is configured to generate an energy beam directed directly onto a construction plane, wherein the exhaust device is configured to exhaust non-solidified construction material detached from the construction plane during processing and/or process gases arising during processing, and wherein
the exhaust device comprises at least one exhaust element through which a suction flow may or does flow, wherein the at least one exhaust element comprises an inner flow chamber defining a flow channel for the suction flow and at least one passage opening leading into the inner flow chamber and extending through a longitudinal extent of the at least one exhaust element, wherein the at least one passage opening is formed in the at least one exhaust element for passage of an energy beam generated by a device in the apparatus and directed directly onto the construction plane perpendicular to the longitudinal extent of the at least one exhaust element.

17. A method for the generative production of a three-dimensional object by successive, selective layer-by-layer solidification of individual construction material layers of a solidifiable construction material with an energy beam generated by a radiation generation device, wherein an exhaust device as claimed in claim 16 is used to exhaust non-solidified construction material detached from a construction plane during processing and/or process gases arising during processing.

18. The apparatus as claimed in claim 3, wherein the device comprises a plurality of laser diode elements and/or optical elements, wherein the laser diode elements and/or the optical elements cover the complete area of the construction plane.

19. The apparatus as claimed in claim 12, wherein the exhaust plate covers the entire area of the construction plane.

20. The apparatus as claimed in claim 13, wherein the at least two exhaust elements are arranged offset relative to one another.

\* \* \* \* \*